June 17, 1947. W. E. MOORE 2,422,362
FURNACE ELECTRODE REGULATOR
Filed June 13, 1944
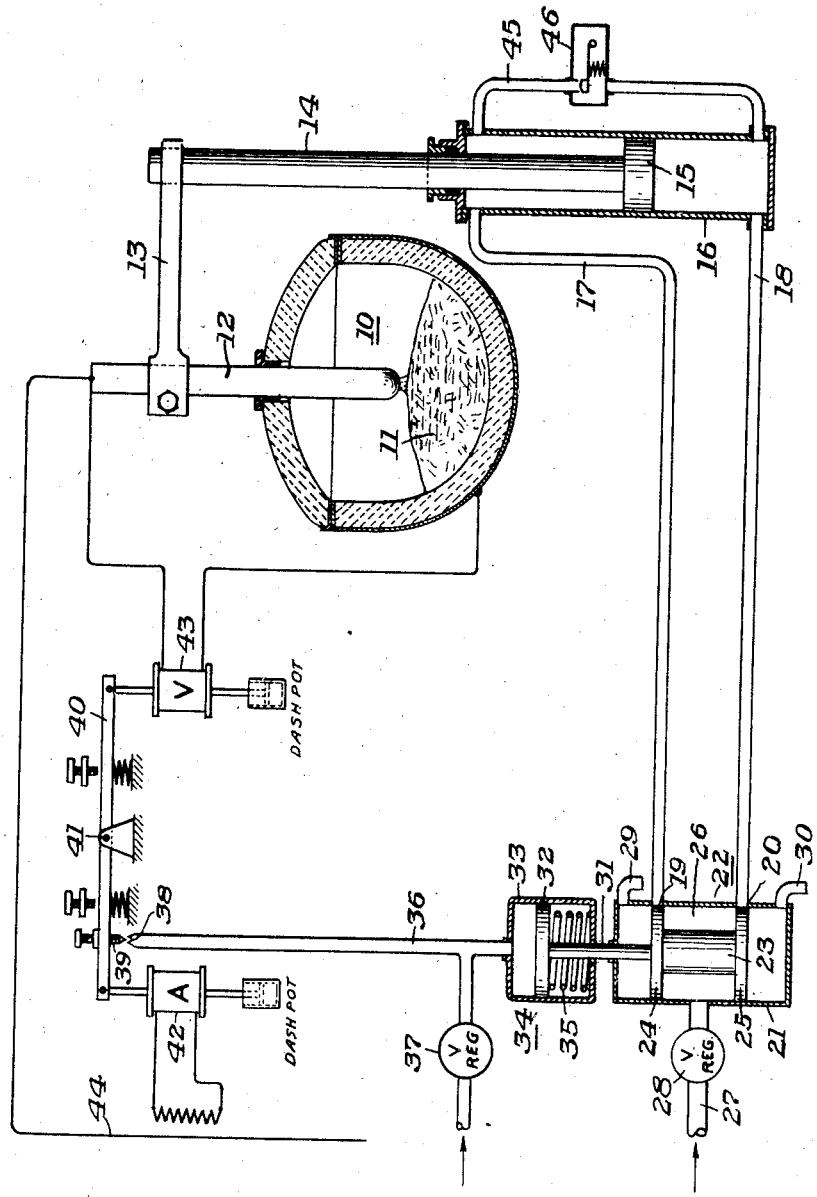
INVENTOR
William Enoch Moore
by his attorney
Christy, Parmelee Strickland Patented June 17, 1947

2,422,362

UNITED STATES PATENT OFFICE 2,422,362

FURNACE ELECTRODE REGULATOR

William Enoch Moore, Pittsburgh, Pa., assignor to Delaware Engineering Corporation, Pittsburgh, Pa., a corporation of Delaware Application June 13, 1944, Serial No. 540,064

17 Claims. (Cl. 314—61)

This invention relates to a furnace electrode regulator for electric arc furnaces of the type in which the positions of the movable electrodes are automatically adjusted by means of fluid actuated regulators, which are controlled by apparatus which embody means responsive to the electric current supplied to the furnace.

In the operation of an electric furnace the electric power supplied to the electrodes varies while the furnace is operating. This is due to various causes such as the burning away of the electrodes and this causes changes in the voltage and amperage of the current. For the successful operation of a furnace the variations in the current supply should be kept at a minimum and this entails accurate adjustment of the electrodes during operation so that an arc gap of predetermined length can be maintained.

By means of apparatus which I have invented, the variations of the electric power are employed through suitable devices to control the flow of fluid to a motor, and the operation of this motor will cause the electrode to which it is attached to move toward or away from the metal charge in the furnace.

In order for electrode control apparatus to function properly, the apparatus should be such as to cause the electrodes to be moved positively, quickly, smoothly and gently at a modulated rate when the current and/or voltage of the power supply changes and the movement should be in proportion to the amount of the change. Furthermore, the arrangement should be such that the moving force should be so controlled that the electrode cannot be pressed down on a charge with too great force.

Most of the apparatus arrangements heretofore used to regulate the position of the electrodes have been unduly complicated, expensive and difficult to maintain, or they have rendered unsatisfactory service, whereas the arrangement that I have invented requires simple mechanical equipment, is compact, affords very satisfactory electrode control, is inexpensive, and substantially trouble free.

One object of my invention is to provide an automatic regulator for the electrode of an electric arc furnace which draws a substantially constant supply of electric current from the furnace power system, and will cause the electrode to move positively and gently.

A further object is to provide apparatus which is fluid operated and which is susceptible to close and accurate control.

Another object is to provide an electrode control which is sensitive but does not move the electrode jerkily or cause it to hunt. The aim is to provide an adjustment of the electrode in which the movement is at a rate proportional to the degree of fluctuation in the power supplied thereto.

A still further object is to provide an electrode control system which is simple in construction, durable, inexpensive to construct, install and operate, and which affords a high power factor.

According to my invention, each electrode is moved by a fluid operated motor, which is automatically and accurately controlled in response and in proportion to variations in the current flowing through the electrode, and the weight of the electrode and connected parts is balanced so that no considerable weight will be carried by the electrode, as when "bottoming" upon the furnace charge.

Broadly speaking, my invention includes a fluid motor operatively connected with a furnace electrode and adapted to move it to adjust the length of the arc, means responsive to variations of the electrode current supply for controlling the operation of the motor, and means including an air control system in which "bleeding" of the air pressure is controlled so as to cause fluid pressure to flow to or from the motor.

In the accompanying drawing, I have shown for purposes of illustration only, a preferred embodiment of my invention.

The apparatus in general includes a fluid actuated motor for moving an electrode to which it is attached, a control valve for controlling the flow of actuating fluid to and from the motor, a pilot valve for regulating the control valve, an air control system connected to the pilot valve, and means responsive to the flow of electric power to the electrode for causing changes in the air pressure in the air control system, the latter means being effective to change the air pressure in the air control system at a rate which is in proportion to the variations in the flow of the electric power.

In the drawing which is diagrammatic I have shown an electric furnace 10, containing a usual charge 11 of metal, and an electrode 12 connected to an electrode arm 13. Many furnaces use three electrodes but I will describe the control for one electrode only, as the same type of electrode regulator may be used for each electrode.

The arm 13 is insulated from and supported by a plunger 14 which is connected to a piston 15 of larger cross section, which piston is slidably received in the cylinder 16. The piston and cylinder form a fluid operated or expansible chamber fluid motor. The effective area of the top of the piston 15 i. e., the area of the piston less the area of the plunger, and the area of the bottom of the piston are such that under the influence of the fluid pressure to be supplied to both ends of the piston, as will be described hereinafter, the electrode 12, supporting arm 13 and plunger 14 will be supported and balanced, with preferably, but not necessarily, a slight tendency toward downward movement of the electrode 12 and connected equipment.

The cylinder 16 is connected at the top by tube 17 and at the bottom by tube 18 to spaced-apart openings 19 and 20 respectively in the cylinder 21 of a control valve 22, which may be located close to or at a distance from the cylinder. A movable piston 23 is closely fitted in the cylinder 21. The piston includes two spaced-apart land portions 24 and 25 which close the openings or inlets 19 and 20 respectively. The lands 24 and 25 just cover the openings 19 and 20 so that any movement of the piston 23 uncovers portions of both the inlets 19 and 20. The piston between the land portions 24 and 25 is of reduced area, and into the ring-like space 26 between the piston and the cylinder, a pipe 27 is connected. The pipe 27 is in turn connected to a source (not shown) of fluid under substantially constant pressure, which I term working fluid, say of the order of 100 pounds per square inch which I designate as high pressure. I prefer to employ a regulating valve 28 in pipe 27. The cylinder 21 has a discharge pipe 29 connected to the top and a discharge pipe 30 connected to the bottom thereof.

The piston 21 is connected by means of a rod 31 to a sliding piston 32 which is closely fitted in a cylinder 33 of a pilot valve 34 and is biased upwardly by the spring 35 interposed between the lower end of the cylinder and the bottom of the piston 32. The upward movement of the piston 32 is opposed by air pressure which is regulated by bleeding of an air flow. For this purpose there is connected to the upper end of the cylinder 33 an air tube 36, which tube is supplied through a regulator valve 37 with air under substantially constant flow and at a normal pressure of the order of say 30 pounds per square inch from any convenient source (not shown), which fluid I refer to as low pressure fluid. The upper end of the tube 36 terminates in an air pilot nozzle or fluid bleed 38, with which is associated an adjustable nozzle closer 39 the position of which relative to the nozzle tip is controlled by regulating means responsive to voltage and amperage of the electric power supplied to the furnace electrode.

Suitable regulating means responsive to the electric power supplied to a furnace electrode may conveniently include a walking beam 40 pivoted at 41, and having solenoids 42 and 43 connected at opposite ends of the beam. The solenoid 42 has a current coil A operatively in circuit with the current lead 44, while the solenoid 43 has a voltage coil V connected to a source of voltage that varies in proportion to the current supplied to the electrode 12 and is here shown connected between the electrode 12 and the shell of furnace 10. The solenoids have the customary dash pots associated therewith. The adjustable nozzle closer 39 is attached to the walking beam 40 near the end of the beam to which the current solenoid 42 is connected. The regulating means described is generally similar to the regulator CR 4913 type electrode regulator for arc control (General Electric Co.) and the automatic current regulator for electric arc furnaces (Westinghouse Electric and Manufacturing Company), Catalog I. B. 5707-A, page 8, figure 5, and since such devices and the operation thereof are well known in the art it is considered unnecessary to describe it in detail.

The position of the nozzle closer 39 relative to the air pilot nozzle 38, the normal air pressure in tube 36, the electrical characteristics of the solenoids 42 and 43, the biasing effect of the spring 35 are all so correlated that the electrode 12 will be so positioned as to maintain a predetermined arc gap and cause the desired current flow between the electrode and the furnace charge. If the electrode 12 thereafter approaches too closely to the charge 11, the power supply to the furnace will be too great and the solenoid 42 will operate to cause the nozzle closer 39 to approach the nozzle 38, thereby decreasing proportionally the flow of air from the pilot nozzle 38. This will cause the increasing pressure to build up in tube 36 and in cylinder 34 which will proportionally move piston 32 and connected piston 23 downwardly until the increased pressure is balanced by the increased stress of the compressed spring 35, and such movement of the parts is effective to uncover the upper ends of ports 19 and 20 thus allowing fluid under pressure (say of the order of 100 pounds per square inch) to flow from pipe 27 through tube 18 into the bottom of cylinder 16 and to relieve the pressure exerted against the top of piston 15 through tube 17 and port 19. The piston 15 will move upwardly and will raise the electrode 12 thus lengthening the arc, whereupon the influence of solenoids 42 and 43 will cause the walking beam to assume such a position that the discharge of air through nozzle 38 will be such as to cause the piston 23 of control valve 22 to entire neutral position, in which equilibrium balance is established between the stress of spring beneath piston 32 and the pressure of the air above, with both ports 19 and 20 closed.

Should the electrode 12 be too greatly separated from the charge 11 the current will drop and the voltage increase so that the nozzle closer 39 will permit the air pressure in tube 36 to drop and the piston 32 will be moved upwardly by spring 35, thus causing the piston 23 to move to allow fluid under pressure to pass through opening 19 and tube 17 to the top of the cylinder 16 and allow the pressure in the bottom of the cylinder 16 to be relieved and the piston 15 and connected electrode 12 will be moved downwardly thus shortening the arc gap.

In order to insure against a failure of the apparatus which would cause the piston and connected electrode to be forced downwardly so as to urge the electrode too strongly against the charge, and thus injure the electrode, I provide a pressure relief by-pass between the top of the cylinder 16 and the bottom thereof. The pressure relief by-pass consists of a tube 45 connecting the top and bottom parts of the cylinder 16, with a relief check valve 46 in the tube, so arranged that should the difference in pressure of the fluid in the top and bottom of the cylinder exceed say fifteen pounds per square inch the valve 46 would operate and allow fluid to flow through by-pass tube 45 from the top portion to the bottom and thus relieve the pressure against the piston 15 and consequently the pressure of the electrode against the charge.

In operation the air pressure in tube 38 does not vary appreciably from the designed normal of say thirty pounds per square inch. Any departure from this pressure due to any change in the rate of flow from the air pilot nozzle 33 causes almost instantaneous movement of the pilot valve piston 32 and control valve piston 23 and consequently the movement of the electrode such movements being proportional in degree to the change in the rate of flow from the air pilot nozzle. Thus the apparatus very promptly and positively responds to variations in the power supply to the electrode and in a very gentle and modulated manner. The control is exceedingly precise and due to the nature of dense air which is supplied to the cylinder 16 there is a pronounced absence of any jerky motion. The control is modulated, precise and gentle. And especially is this true when the fluid pressure medium is air under pressure, say of the order of about 100 pounds per square inch as air in such condition does not have the elastic properties of air at ordinary atmospheric pressure. The control may be termed "modulating" in contradistinction to fixed speed control. A change even though small, promptly effects a proportional change in the position of the nozzle closure and a proportional change takes place in the control mechanism so that the electrode is moved with modulation and proportionately to the power change. Accordingly a small change in the electrode power will be promptly corrected in a modulated but effective movement of the electrode. In the event of a major change in electrode position, the quick opening of the ports 19 and 20 in the control valve will allow a rapid and positive adjustment of the electrode proportioned to the modulation in power input to the furnace.

I have described the working fluid as air under pressure, and this in some instances I prefer to use. I may also use other gases, and in some cases preferably use liquids such as hydrocarbon oils, alcohol, and even water; and I mean the term fluid, pressure fluid or working fluid to include air and other gases and liquids.

While I have described the presently preferred embodiment of my invention, it is to be understood that various changes may be made in the described apparatus and other arrangements be resorted to within the scope of the following claims.

I claim as my invention:

1. Apparatus for regulating the position of an electrode in an electric arc furnace, including a fluid operated motor movably associated with the electrode, a high pressure fluid supply line, a control valve for controlling the flow of fluid under high pressure to and from the motor, a pilot valve for operating the control valve, a low pressure fluid supply line, said pilot valve being controlled by the variations in pressure of low pressure fluid supplied to it, and means responsive to the electric current supplied to the electrode for varying the pressure of the last mentioned fluid supply.

2. Apparatus for positioning an electrode in an electric arc furnace, including a fluid operated motor operatively connected to the electrode, a high pressure fluid supply line, a control valve for controlling the flow of fluid under high pressure to and from the motor, a low pressure fluid supply line, a fluid actuated pilot valve responsive to variations in the low fluid pressure supplied thereto for operating the control valve, means including a fluid bleed responsive to the variations in the flow of electric current to the electrode for varying the pilot valve fluid pressure, and thereby cause the pilot valve to operate the control valve.

3. Apparatus for positioning an electrode in an electric arc furnace, including a fluid operated motor operatively connected to the electrode, a high pressure fluid supply line, a control valve for controlling the flow of fluid under high pressure to and from the motor, a low pressure supply line, a pilot valve operatively connected to the control valve and operated by change in the pressure of low pressure fluid supplied thereto, means whereby fluid under pressure is supplied to the pilot valve, and means responsive to variations in the electric current supplied to the electrode for causing changes in the pressure of the last mentioned fluid.

4. Apparatus for regulating the position of an electrode in an electric arc furnace, including a ram whose plunger bears the weight of the supported electrode, said ram plunger being operated by high pressure fluid, a control valve for regulating the flow of high pressure fluid to and from the ram, a pilot valve responsive to low pressure fluid operatively connected to the control valve for regulating the operation thereof, means for supplying low pressure fluid to the pilot valve, and means responsive to the variations in the electric current supplied to the electrodes for varying the pressure of the low pressure fluid.

5. Apparatus for positioning an electrode in an electric arc furnace including a vertically movable piston arranged to sustain the weight of the electrode, a cylinder in which the piston is slidably received, means for controlling the flow of pressure fluid to the cylinder, means for regulating the said controlling means, said last mentioned means including a pilot valve operatively connected to the controlling means, means for supplying fluid under pressure to the pilot valve, and means responsive to the flow of electric current to the electrode for varying the pressure of the fluid supplied to the pilot valve.

6. Apparatus for positioning an electrode in an electric arc furnace including a vertically movable piston operatively connected to the electrode, a cylinder in which the piston is slidably received, means for controlling the flow of high pressure air to the cylinder, means for regulating the said controlling means, said last mentioned means including a pilot valve operatively connected to the controlling means, means for supplying low pressure air to the pilot valve, and means responsive to the flow of electric current to the electrode for varying the pressure of the air supplied to the pilot valve.

7. Apparatus for regulating the movement of an electrode of an electric arc furnace, including a vertically movable plunger operatively connected to the electrode, a piston connected to the plunger and slidably received in a cylinder, means for leading fluid under pressure to and from the upper end of the cylinder, means for leading fluid under pressure to and from the lower end of the cylinder, the effective area of the top of the piston and the area of the bottom of the piston being so related that when subjected to equal pressure, the piston and connected equipment will be approximately balanced, a control valve connected to both fluid leading means, said control valve including a piston for controlling the flow of fluid through the fluid leading means, a pilot valve for regulating the position of said piston, said pilot valve including a piston, means for supplying fluid under pressure to the piston of the pilot valve, and means for varying the pressure of the said last mentioned fluid.

8. Apparatus for regulating the movement of an electrode of an electric arc furnace, including a vertically movable plunger connected to the electrode, a piston connected to the plunger and slidably received in a cylinder, means for leading fluid under pressure to and from the upper end of the cylinder, means for leading fluid under pressure to and from the lower end of the cylinder, the effective area of the top of the piston and the area of the bottom of the piston being so related that when subjected to equal pressure, the piston and connected equipment will be approximately balanced, a control valve connected to both fluid leading means, said control valve including a piston for controlling the flow of fluid through the fluid leading means, a pilot valve for regulating the position of said piston, said pilot valve including a piston, means for supplying fluid under pressure to the piston of the pilot valve, and means responsive to the flow of electric current to the electrode for varying the pressure of the fluid supplied to the pilot valve piston.

9. Apparatus for regulating the movement of an electrode of an electric arc furnace, including a vertically movable plunger connected to the electrode, a piston connected to the plunger and slidably received in a cylinder, means for leading fluid under pressure to and from the upper end of the cylinder, means for leading fluid under pressure to and from the lower end of the cylinder, the effective area of the top of the piston and the area of the bottom of the piston being so related that when subjected to equal pressure, the piston and connected equipment will be approximately balanced, means operable upon a predetermined increase of pressure of the fluid in the top of the cylinder over the fluid in the lower part of the cylinder, for increasing the pressure in the lower part of the cylinder, means for controlling the flow of fluid to the cylinder, means for regulating said control means, said regulating means including a fluid bleed, and means for controlling the fluid bleed.

10. Apparatus for regulating the movement of an electrode of an electric arc furnace, including a vertically movable plunger connected to the electrode a piston connected to the plunger and slidably received in a cylinder, means for leading fluid under pressure to and from the upper end of the cylinder, means for leading fluid under pressure to and from the lower end of the cylinder, the effective area of the top of the piston and the area of the bottom of the piston being so related that when subjected to equal pressure, the piston and connected equipment will be approximately balanced, means operable upon a predetermined increase of pressure of the fluid in the top of the cylinder over the fluid in the lower part of the cylinder, for increasing the pressure in the lower part of the cylinder, means for controlling the flow of fluid to the cylinder, means for regulating said control means, said regulating means including a fluid bleed, and means responsive to the flow of electric current to the electrode for controlling the fluid bleed.

11. Apparatus for regulating the movement of an electrode of an electric arc furnace, including a vertically movable plunger connected to the electrode, a piston connected to the plunger and slidably received in a cylinder, means for leading fluid under pressure to and from the upper end of the cylinder, means for leading fluid under pressure to and from the lower end of the cylinder, the effective area of the top of the piston and the area of the bottom of the piston being so related that when subjected to equal pressure, the piston and connected equipment will be approximately balanced, means operable upon a predetermined increase of pressure of the fluid in the top of the cylinder over the fluid in the lower part of the cylinder, for increasing the pressure in the lower part of the cylinder, means for controlling the flow of fluid to the cylinder, a pilot valve for regulating said control means, means for supplying air under substantially constant pressure to the pilot valve, an air pilot nozzle connected to the air supply means, and means responsive to the flow of current to the electrode for regulating the flow of air from the nozzle and thus varying the air pressure exerted on the pilot valve.

12. Apparatus for regulating the position of an electrode in an electric arc furnace including a vertically movable piston operatively connected to the electrode, a cylinder in which the piston is slidably received, means for controlling the flow of high pressure air to the cylinder, a pilot valve for regulating said control means, means for supplying air under substantially constant pressure to the pilot valve, an air pilot nozzle connected to the air supply means, and means responsive to the flow of current to the electrode for regulating the flow of air from the nozzle and thus varying the air pressure exerted on the pilot valve.

13. Apparatus for positioning an electrode of an electric arc furnace, including a vertically movable plunger connected to the electrode, a piston connected to the plunger and slidably received in a cylinder, a control valve including a cylinder, piston and means for leading fluid under pressure into the cylinder, two tubes connecting the control valve cylinder and the top and bottom respectively of the first mentioned cylinder, the control valve piston being so arranged as to allow pressure fluid to flow through one tube to one portion of the first mentioned cylinder and through the other tube from the other portion of the first mentioned cylinder, means for moving the control valve piston, said last mentioned means including air under pressure that is relatively low with respect to the pressure of said fluid and means responsive to the flow of current to the electrode for varying the air pressure.

14. Apparatus for positioning an electrode of an electric arc furnace, including a vertically movable plunger operatively connected to the electrode, a piston connected to the plunger and slidably received in a cylinder, a control valve including a cylinder, slidable piston and means for leading fluid under pressure into the control valve cylinder, two tubes connecting the control valve cylinder and the top and bottom respectively of the first mentioned cylinder, the control valve piston being so arranged as to allow pressure fluid to flow through one tube to one portion of the first mentioned cylinder and through the other tube from the other portion of the first mentioned cylinder, a pilot valve including a piston slidably received in a cylinder, and operatively connected to the control valve piston, means biasing the pilot valve piston in one direction, means supplying air under relatively low pressure with respect to the pressure of said fluid, said air urging the pilot valve piston in the opposite direction, and means responsive to the flow of current to the electrode for varying the air pressure and thus cause movement of the pilot valve piston and connected control valve piston.

15. Apparatus for regulating the movement of an electrode of an electric arc furnace, including a vertically movable plunger operatively connected to the electrode, a piston connected to the plunger and slidably received in a cylinder, a control valve including a cylinder, piston and means for leading fluid under pressure into the cylinder, two tubes connecting the control valve cylinder and the top and bottom respectively of the first mentioned cylinder, the control valve piston being so arranged as to allow pressure fluid to flow through one tube to one portion of the first mentioned cylinder and through the other tube from the other portion of the first mentioned cylinder, a pilot valve including a piston slidably received in a cylinder, said pilot valve piston being operatively connected to the control valve piston, means urging the pilot valve piston in one direction, means supplying air under relatively low pressure with respect to the pressure of said fluid, said air urging the pilot valve piston in the opposite direction, an air pilot nozzle for allowing escape of air operatively connected to the pilot valve piston, and means responsive to the flow of current to the electrode for regulating said escape of air and thus vary the air pressure exerted on the pilot valve piston.

16. Apparatus for regulating the position of an electrode in an electric arc furnace, including a current supply line to the electrode, a fluid operated motor having a movable member connected to said electrode, means for supplying fluid under pressure in two lines to said motor, the fluid pressure supplied by said lines acting in opposition on said movable member of said motor, with the weight of the electrode sustained by fluid pressure acting on said movable member, a by-pass for fluid extending between the opposite sides of said movable member and including a check valve permitting a by-passing flow of fluid from one side of the movable member to the other when the difference in pressure of the fluid acting on the opposite sides of said movable member exceeds a critical value, a control valve for controlling the flow of fluid under pressure through said two lines, and means responsive to variations in the current supplied to the electrode for shifting said control valve to effect a proportional fluid flow simultaneously into one of said lines and out of the other and thereby shift said movable motor member, whereby the position of said electrode is modulated in accordance with said variations in current.

17. Apparatus for regulating the position of an electrode in an electric arc furnace, including a current supply line to the electrode, a fluid operated motor having a movable member connected to said electrode, means for supplying fluid under pressure in two lines to said motor, the fluid pressure supplied by said lines acting in opposition on said movable member of said motor, with the weight of the electrode sustained by fluid pressure acting on said movable member, a control valve for controlling the flow of fluid under pressure through said two lines, a pilot valve for operating said control valve, a line for supplying fluid to said pilot valve at low pressure relatively to the pressure of the fluid supplied to the two lines first mentioned, means for varying the pressure of the low pressure fluid proportionally to variations in the current supplied to the electrode, whereby said control valve is operated and said motor member modulated in accordance with said variations in current.

WILLIAM ENOCH MOORE.

REFERENCES CITED

The following references are of record in the file of this patent:

UNITED STATES PATENTS

| Number | Name | Date |
|---|---|---|
| 324,311 | Fiske | Aug. 11, 1885 |
| 1,282,478 | Smith | Oct. 22, 1918 |
| 1,562,204 | Carlstedt | Nov. 17, 1925 |